May 23, 1950

F. RECK 2,508,539

INTERNAL PIPE CUTTER

Filed June 3, 1947

INVENTOR
F. RECK
BY
Walter C. Kiesel
ATTORNEY

May 23, 1950     F. RECK     2,508,539
INTERNAL PIPE CUTTER
Filed June 3, 1947     2 Sheets-Sheet 2
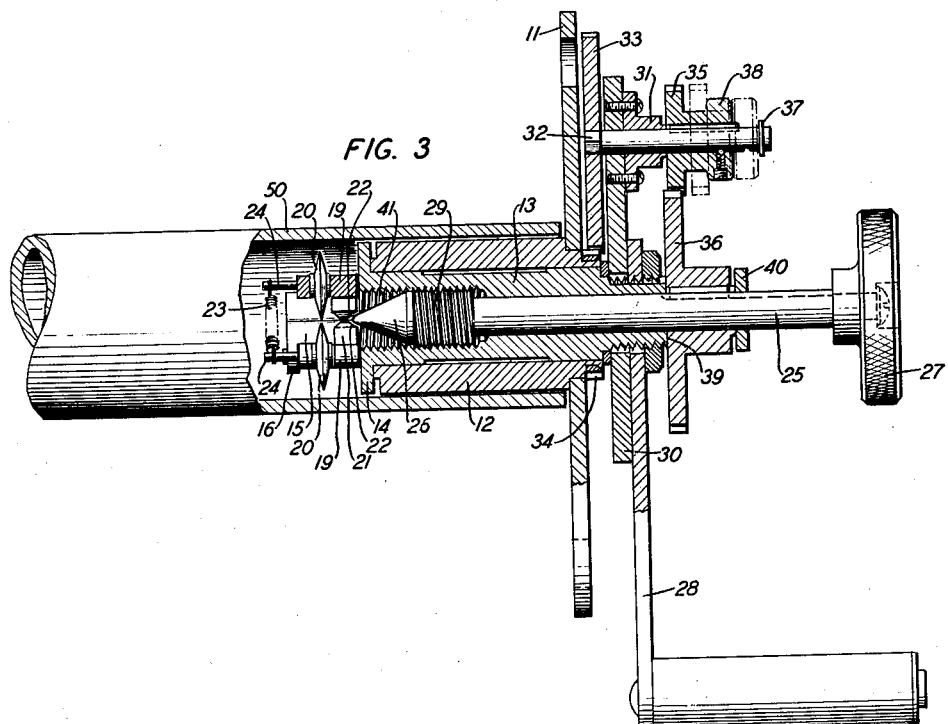
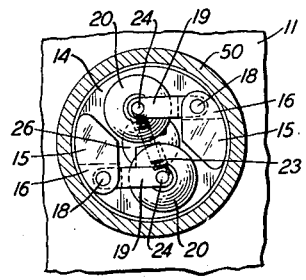
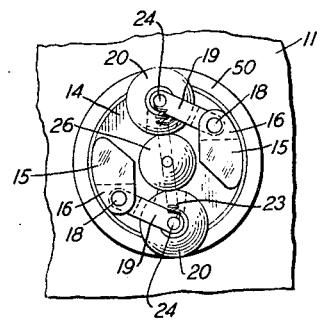
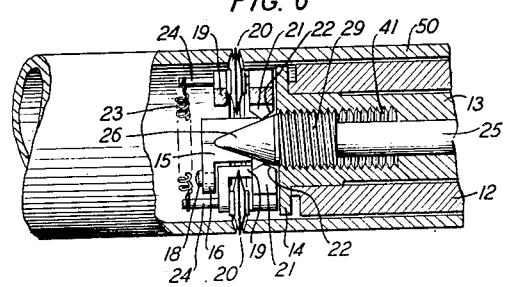
INVENTOR
F. RECK
BY
Walter C. Kiesel
ATTORNEY Patented May 23, 1950

2,508,539

UNITED STATES PATENT OFFICE 2,508,539

INTERNAL PIPE CUTTER

Frank Reck, Flushing, N. Y., assignor to Bell Telephone Laboratories, Incorporated, New York, N. Y., a corporation of New York Application June 3, 1947, Serial No. 752,029

4 Claims. (Cl. 30—107)

This invention relates to pipe cutters and particularly to internal pipe cutters.

An object of this invention is to simplify and improve internal pipe cutters of the type which are employed where the outside surface of the pipe to be cut is not accessible.

In the tool of this invention a hub member is provided at one of its ends for pivotally mounting arms carrying cutting wheels which may be moved by a manually operated member to force them against the interior of the pipe to effect the cutting operation upon the planetary movement of the cutters as effected by the rotation of said hub.

The invention will be readily understood from the following detailed description made with reference to the accompanying drawings in which:

Fig. 3 is a sectional view of the cutter taken on the line 3—3 of Fig. 2;

Fig. 4 shows an end view taken on the line 4—4 of Fig. 1;

Fig. 5 shows an end view with the cutters extended; and

Fig. 6 is a section of the inner end portion of the tool with the cutters extended and a portion of a pipe to be cut.

Figures 1, 2:
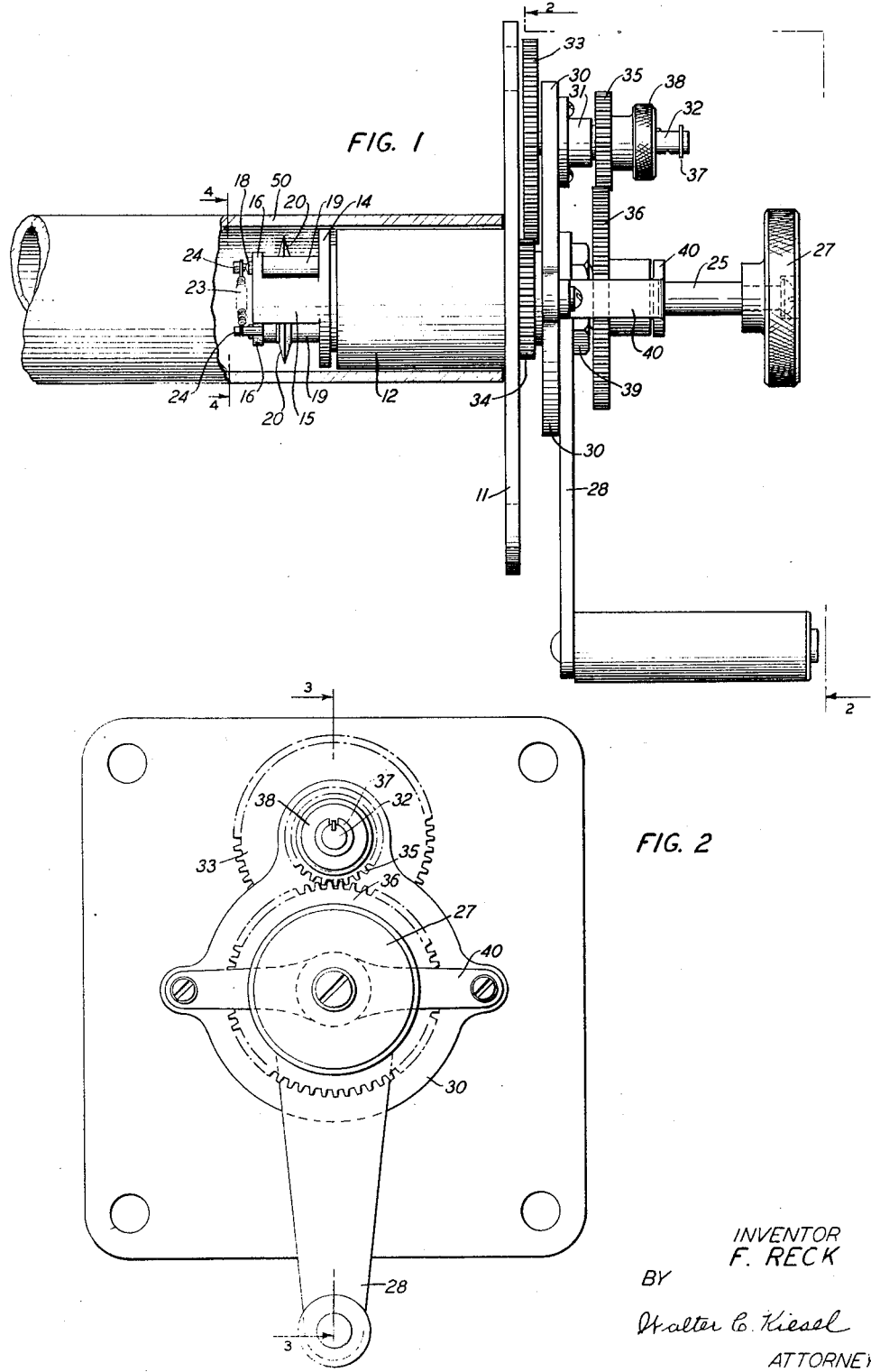
Fig. 1 shows a side elevation of the cutter together with a portion of a pipe to be cut, a portion of the pipe being broken away to show the cutter therein.
Fig. 2 shows an end view taken from the outer side of the base plate.

Referring to the drawings and particularly to Figs. 1, 3 and 6, the tool includes a base plate 11 adapted to be secured stationary relative to the pipe 50 by any convenient clamping means (not shown) after the sleeve portion 12 perpendicular to said plate is inserted into the pipe. Coaxially mounted within the sleeve 12 is a hub 13 carrying on diametrically opposite portions of the periphery of its enlarged inner end 14 projections 15 integral therewith. Offset portions 16 at the ends of the projections 15 provide bearings for the pins 18 on which are hinged one end of the arms 19. This arrangement allows their unhinged ends to be swung outwardly beyond the circumference of the sleeve 12. Rotatably mounted in the bifurcated unhinged ends of arms 19 are the cutter wheels 20 which are extended radially by the outward movement of the ends of the arms. Extensions 21 of said arms 19 project toward the axis of hub 13 and in juxtaposition with its enlarged end 14 providing surfaces 22 inclined to the axis of the hub and forming riders adapted to cooperate with an axially adjustable cam surface 26 which may be extended from within the hub 13 to separate the rider surfaces 22 and thus cause the cutter bearing arms 19 to swing outwardly around pins 18. The arms 19 are caused to retract radially, when the cam surface 26 is withdrawn from between the riders 22, by a tension spring 23 which is secured to the projecting ends of the cutter wheel axles 24.

In order to extend the cutters radially a spindle 25 is mounted in threaded engagement with the inner surfaces of the hub 13 and carries at its inner end a conical camming surface 26 which may be screwed inwardly by turning the handle 27 attached to the outer end of the spindle. The axial advancement of cam 26 causes the arms 19 to swing outwardly around pins 18 by the camming action of said cone on the rider surfaces 22 and thus the cutting radius of cutters 20 is increased.

The cutters 20 are rotated within the pipe by turning the crank 28 keyed to the hub 13. In order to automatically feed the cutters outward simultaneously with their rotation, the spindle 25 is geared to hub 13 through a train of gears which rotate the spindle relative to the hub as the cutting operation proceeds, thus the cooperating lead threads 29 on the spindle and 41 on the inner portion of the hub cause a continuous outward extension of the spindle and in turn a radial extension of the cutter wheels as the crank handle is rotated in a counterclockwise direction.

The support plate 30 keyed to the hub 13 carries a bearing 31 in which is journaled shaft 32. Gear 33 keyed on shaft 32 permanently engages the stationary gear 34 secured to base plate 11 and rotates about it as crank 28 is turned, thus rotating shaft 32 and the splined gear 35. Gear 35 is slidably mounted on shaft 32 so as to permit it to be engaged, as shown in Fig. 1, with gear 36 which is keyed to spindle 25, or disengaged, as shown by the dotted lines of Fig. 3, by sliding it outward to the limit ring 37 mounted at the outer end of shaft 32. With this arrangement the knurled knob 38, an integral portion of gear 35, may be pulled outwardly to permit circumferential adjustment of the cutters 20 by turning the handle 27 and thus rotating the spindle 25 independent of the hub 13 and the gear train.

Spindle gear 36 is so keyed to the spindle 26 as to permit it to slide axially thereon as the spindle advances into or retracts from within the hub 13. In order to maintain the operable position of gear 36 relative to the remainder of the gear train, it is held immovable axially, relative to support plate 30, against bearing 39 by means of the bracket 40 which is secured to said support plate.

In operating this tool, the sleeve 12 is inserted in the pipe to be cut with the cutters contracted and gear 35 disengaged. The cutters are positioned axially in the pipe as desired and the base plate 11 is then clamped. Handle 27 is turned, advancing spindle 25 to the position where cam 26 causes riders 22 to carry the cutters 20 into engagement with the inner wall of the pipe. Knob 38 is then pushed inward engaging gears 35 and 36 so that as the hub is turned by crank 28 the spindle is simultaneously turned relative to it thus extending the cutters circumferentially as they are rolled over the inner pipe surface. At the completion of the cut the cutters 20 are positioned as shown in Figs. 5 and 6 and in order to retract them as shown in Fig. 4 the knob 38 is pulled out, as shown in dotted lines in Fig. 3, thereby disengaging the automatic feed mechanism from spindle 25 which can then be turned back into the hub by handle 27 thus allowing the spring 23 to draw the cutters within the circumference of the sleeve. The severed portion of the pipe may then be removed from the sleeve; and the tool is then in condition for further use.

Although this tool is shown manually operable, it is evident it could readily be adapted for a power drive, for example, by eliminating crank 28 and substituting for support plate 30 a gear having a radius large enough to allow shaft 32 to be supported thereon and function as set forth above, said power drive being connected thereto by a cooperating gear or train of gears.

What is claimed is:

1. A pipe cutting tool comprising a hub element having diametrically opposite projections formed at one end thereof, an arm pivoted on each of said projections, a cutting wheel carried by each of said arms, a plunger member threadedly engaging the interior of said hub element, said plunger having a sloping end portion engaging said arms collectively for controlling the cutting feed of said wheels, and a gearing mechanism for rotating said plunger relative to said hub element simultaneously with the rotation of the latter for effecting the cutting of the pipe.

2. A pipe cutting tool comprising a hub element having diametrically opposite projections formed at one end thereof, an arm pivoted on each of said projections, a cutting wheel revolvably mounted on the outer end of each of said arms, a spindle threadedly engaging the interior of said hub, said spindle having a sloping end portion engaging said arms collectively for controlling the radial extension of said cutting wheels, means for manually adjusting the axial position of said spindle carried by a portion thereof exterior of said hub, manually operable means for rotating said hub, a gearing mechanism actuated by the movement of said hub operatively connecting with said spindle to cause an axial movement of the latter thereby controlling the radial feed of said cutting wheels, and means to disengage said gearing of said hub and spindle whereby the diametrical extension of said cutting wheels can be adjusted independently of said hub.

3. A pipe cutting tool comprising a base plate, a sleeve integral therewith and perpendicular thereto, a hub element supported in said sleeve, an enlarged end portion on said hub, diametrically opposite extensions on said enlarged portions, an arm pivoted on each of said projections, a cutting wheel revolvably mounted on the outer end of each of said arms, spring means associated with said arms and tending to cause them to swing inwardly, a spindle coaxially carried within said hub and in threaded engagement therewith, a conical end portion on said spindle adapted to be advanced into engagement with the inner surface of said arms, whereby they are caused to swing radially outward at their cutter bearing ends, a gearing mechanism for rotating said spindle within said hub and thereby radially extending the cutter wheels simultaneously with the rotation thereof, means to disengage said gear mechanism from said spindle, means to independently control the axial position of said spindle when the disengaging means is operative, and an outer hub portion adapted to be coupled to a rotating means.

4. A pipe cutting tool having a hub portion containing cutters including a driving mechanism having a spindle axially movable within said hub, said spindle having a sloping end portion for controlling the radial extension of said cutters, means for manually adjusting the axial position of said spindle, manually operable means for rotating said hub, a gearing mechanism actuated by the movement of said hub operatively connecting with said spindle to cause an axial movement of the latter thereby controlling the radial feed of said cutters, and means to disengage the gearing of said hub and spindle whereby the diametrical extension of said cutters can be adjusted independently of the rotation of said hub.

FRANK RECK.

REFERENCES CITED

The following references are of record in the file of this patent:

UNITED STATES PATENTS

| Number | Name | Date |
| --- | --- | --- |
| 906,797 | Hawkins | Dec. 15, 1908 |
| 1,927,310 | Edwards | Sept. 19, 1933 |
| 2,276,727 | Johnson | Mar. 17, 1942 |

FOREIGN PATENTS

| Number | Country | Date |
| --- | --- | --- |
| 12,341 | Great Britain | Sept. 12, 1884 |